(12) United States Patent
Greiner

(10) Patent No.: US 11,993,231 B2
(45) Date of Patent: May 28, 2024

(54) CONTROL UNIT AND METHOD FOR OPERATING AT LEAST ONE VEHICLE DECELERATION DEVICE

(71) Applicant: Robert Bosch GmbH, Stuttgart (DE)

(72) Inventor: Matthias Greiner, Simmozheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 887 days.

(21) Appl. No.: 16/981,482

(22) PCT Filed: Feb. 21, 2019

(86) PCT No.: PCT/EP2019/054279
§ 371 (c)(1),
(2) Date: Sep. 16, 2020

(87) PCT Pub. No.: WO2019/201496
PCT Pub. Date: Oct. 24, 2019

(65) Prior Publication Data
US 2021/0009100 A1   Jan. 14, 2021

(30) Foreign Application Priority Data

Apr. 19, 2018   (DE) .......................... 102018205946.2

(51) Int. Cl.
  *B60T 13/66*    (2006.01)
  *B60T 8/32*     (2006.01)
  *B60T 7/04*     (2006.01)
  *B60T 13/14*    (2006.01)
  *B60T 13/74*    (2006.01)

(52) U.S. Cl.
  CPC ............ *B60T 13/662* (2013.01); *B60T 8/326* (2013.01); *B60T 7/042* (2013.01); *B60T 13/146* (2013.01); *B60T 13/745* (2013.01); *B60T 2220/04* (2013.01)

(58) Field of Classification Search
  CPC ........ B60T 13/662; B60T 8/326; B60T 7/042; B60T 13/146; B60T 13/745; B60T 2220/04; B60T 2201/02; B60T 2201/08
  USPC .......................................................... 701/70
  See application file for complete search history.

(56) References Cited

U.S. PATENT DOCUMENTS 6,315,371 B1   11/2001  Wachi et al.
6,460,943 B1 *  10/2002  Toepfer ..................... B60T 8/00
                                                              303/155

(Continued)

FOREIGN PATENT DOCUMENTS

CN    102548818 A    7/2012
CN    103534151 A    1/2014

(Continued)

OTHER PUBLICATIONS

Goto_et_al_JP_2000158973_A_translated_description (Year: 2000).*
International Search Report for PCT/EP2019/054279, dated Apr. 17, 2019.

*Primary Examiner* — Jelani A Smith
*Assistant Examiner* — George A Alcorn
(74) *Attorney, Agent, or Firm* — NORTON ROSE FULBRIGHT US LLP; Gerard A. Messina

(57) ABSTRACT

A control unit for at least one vehicle deceleration device of a vehicle. The control unit includes an electronics unit including a memory unit in which a characteristic curve is stored which specifies a relation between a first input variable specified by an operation of a brake actuation element of the vehicle, and a setpoint variable regarding a setpoint vehicle deceleration exerted on the vehicle using the at least one vehicle deceleration device. The electronics device newly specifies at least one characteristic curve value of the characteristic curve under consideration of a second input variable specified by the driver by an operation of an accelerator of the vehicle, a current traffic and/or environ- (Continued)

ment situation, and/or an ascertained position of the vehicle and a position-specific item of traffic and/or environment information, and the correspondingly modified characteristic curve is stored in the memory unit.

10 Claims, 2 Drawing Sheets

(56) References Cited

U.S. PATENT DOCUMENTS

| | | | | |
|---|---|---|---|---|
| 2014/0152083 A1* | 6/2014 | Strengert | ................ | B60T 1/10 |
| | | | | 303/3 |
| 2018/0072290 A1* | 3/2018 | Boethel | ................ | B60T 8/1708 |
| 2018/0304869 A1* | 10/2018 | Hernandez | ............. | B60T 7/042 |
| 2018/0370546 A1* | 12/2018 | Augst | .................. | B60W 50/14 |

FOREIGN PATENT DOCUMENTS

| | | | | |
|---|---|---|---|---|
| CN | 106402205 A | 2/2017 | | |
| DE | 202010017605 U1 | 10/2012 | | |
| DE | 102016203395 A1 | 9/2017 | | |
| EP | 1108632 A2 | 6/2001 | | |
| EP | 1312523 A1 * | 5/2003 | ............. | B60T 17/22 |
| JP | 2000158973 A * | 6/2000 | | |
| JP | 2000158973 A | 6/2000 | | |
| JP | 2013071719 A | 4/2013 | | |
| JP | 2013240230 A | 11/2013 | | |

* cited by examiner

CONTROL UNIT AND METHOD FOR OPERATING AT LEAST ONE VEHICLE DECELERATION DEVICE

FIELD

The present invention relates to a control unit for at least one vehicle deceleration device of a vehicle. The present invention also relates to a vehicle deceleration device for a vehicle. In addition, the present invention relates to a method for operating at least one vehicle deceleration device of a vehicle.

BACKGROUND INFORMATION

German Patent Application No. DE 20 2010 017 605 U1 describes a control of an electromechanical brake booster, which actuates the electromechanical brake booster while taking signals from a sensor device into account with whose aid a displacement travel of an input element can be determined, as well as a characteristic curve stored in the control. By actuating the electromechanical brake booster, a supplementary force induced by the electromechanical brake booster can be adjusted according to the characteristic curve.

SUMMARY

The present invention provides a control unit for at least one vehicle deceleration device of a vehicle, a vehicle deceleration device for a vehicle, and a method for operating at least one vehicle deceleration device of a vehicle.

The present invention provides possibilities for a self-learning adaptation of a characteristic curve of at least one vehicle deceleration device of a vehicle/motor vehicle to preferences of the driver. Toward this end, with the aid of the present invention, parameters/characteristics of the characteristic curve perceived as personally unsuitable by the driver are able to be identified based on his actuation of an accelerator of his vehicle/motor vehicle and/or based on a deviation or an agreement of a driving behavior of the driver with regard to a current traffic and/or environment situation, and/or with regard to an item of position-specific traffic and/or environment information, and be newly specified in a more driver-friendly manner by a modification of the respective parameters/characteristics of the characteristic curve. In particular, the characteristic curve personally preferred by the driver is thereby able to be identified and be subsequently implemented by a corresponding actuation of the at least one vehicle deceleration device. The present invention thus significantly contributes to an enhancement of the braking comfort and driving comfort of the respective driver.

In one advantageous embodiment of the control unit in accordance with the present invention, the electronics device is developed to reduce at least one characteristic curve value of the characteristic curve after a braking operation induced by the at least one actuated vehicle deceleration device if at least the second input variable input by the driver during a first time interval after the induced braking operation exceeds a predefined maximum value, and/or to increase at least one characteristic curve value of the characteristic curve if at least the second input variable specified by the driver during the first time interval after the induced braking operation remains below a predefined minimum value. In this way it is possible to "learn" the preferences of the driver with regard to the characteristic curve.

Alternatively or additionally, the electronics device may also be configured to specify a setpoint velocity of the vehicle based on the ascertained current traffic and/or environment situation and/or based on the ascertained position of the vehicle and the item of position-specific traffic and/or environment information; and if at least an actual velocity of the vehicle deviates by more than a predefined limit velocity difference from the specified setpoint velocity of the vehicle during a braking operation induced by the at least one actuated vehicle deceleration device and/or during a second time interval after the induced braking operation, it is designed to newly specify at least one characteristic curve value of the characteristic curve. This, too, makes it possible to "learn" the preferences of the driver with regard to the characteristic curve.

The electronics device is preferably developed to specify as the setpoint velocity a setpoint velocity characteristic of the vehicle featuring a minimal energy consumption of the vehicle and/or a minimal pollutant emission of the vehicle based on the ascertained current traffic and/or environment situation and/or based on the ascertained position of the vehicle and the item of position-specific traffic and/or environment information. The energy consumption of the vehicle and possibly also a pollutant emission of the vehicle are thus able to be lowered with the aid of this specific embodiment of the control unit.

For instance, the electronics unit may be developed to actuate as the at least one vehicle deceleration device under consideration of the characteristic curve and the first input variable a brake booster connected upstream from a master brake cylinder, at least one electric motor operable as a generator, at least one piston-cylinder device, and/or a pump system having at least one hydraulic pump. As a result, the control unit is able to be utilized for a multitude of vehicle deceleration devices. However, the usability of the control unit is not limited to the vehicle deceleration devices enumerated here.

A vehicle deceleration device for a vehicle having a corresponding control unit also provides the afore-described advantages. For instance, the vehicle deceleration device may include the brake booster, the at least one electric motor operable as a generator, the at least one piston-cylinder device, and/or the pump system having the at least one hydraulic pump. Additional examples of the vehicle deceleration device are possible.

In addition, an execution of a corresponding method for operating at least one vehicle deceleration device of a vehicle likewise provides the afore-described advantages. It is expressly pointed out that the present method for operating at least one vehicle deceleration device of a vehicle according to the afore-described specific embodiments of the control unit is able to be developed further.

BRIEF DESCRIPTION OF THE DRAWINGS

Further features and advantages of the present invention are described below based on the figures.

DETAILED DESCRIPTION OF EXAMPLE EMBODIMENTS

Figure 1:
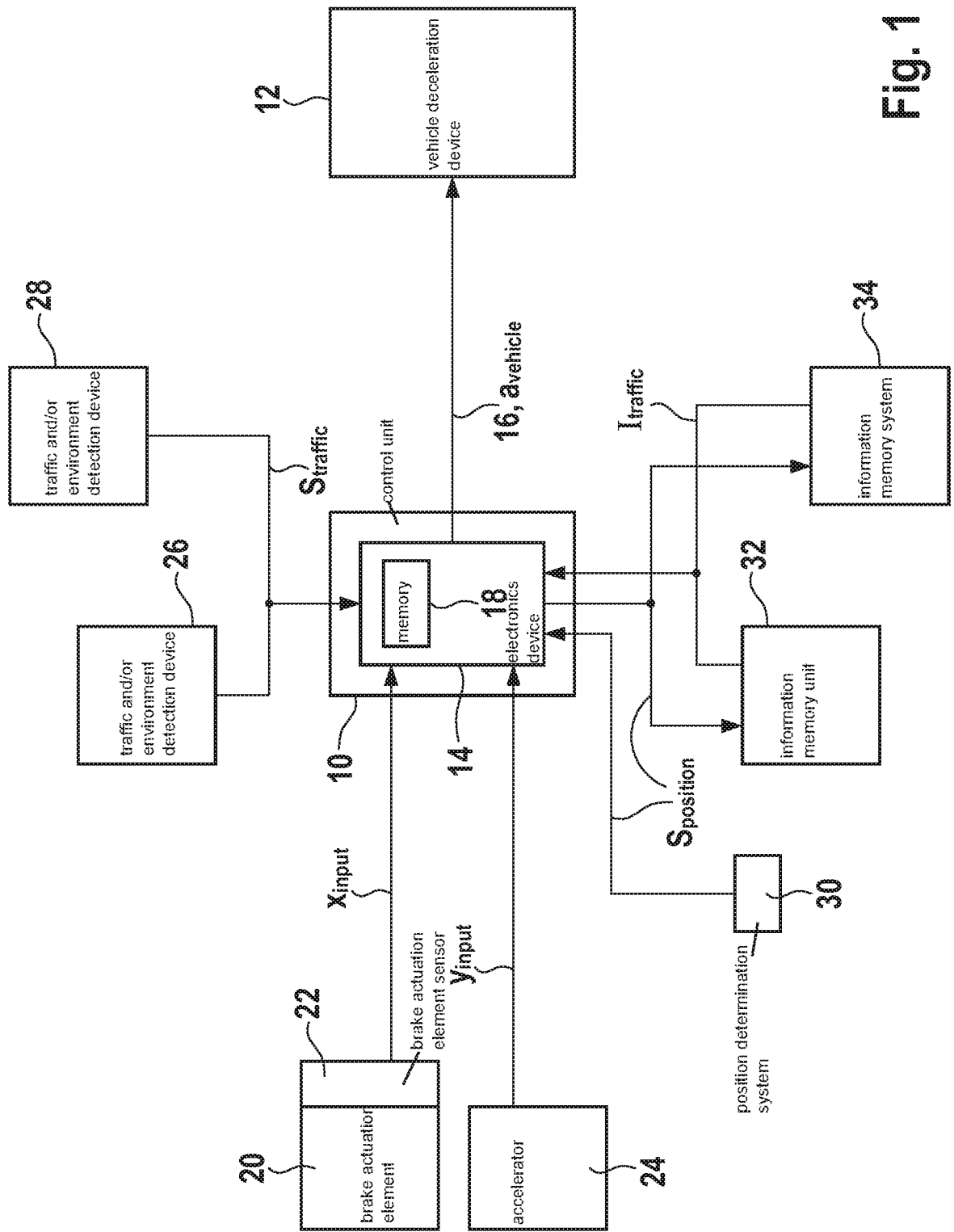
FIG. 1 shows a schematic illustration of a specific embodiment of the control unit for at least one vehicle deceleration device of a vehicle.

FIG. 1 shows a schematic illustration of a specific embodiment of the control unit for at least one vehicle deceleration device of a vehicle.

Control unit 10 described herein is able to be used for actuating/operating at least one vehicle deceleration device 12 of a vehicle/motor vehicle. It is expressly pointed out that a usability of control unit 10 is restricted neither to a certain type of the at least one vehicle deceleration device 12 nor to a special vehicle type/motor vehicle type of the vehicle/motor vehicle equipped with the at least one vehicle deceleration device 12. Control unit 10 or an electronics device 14 of control unit 10, for example, may be configured to actuate as the at least one vehicle deceleration device 12 a brake booster connected upstream from a master brake cylinder such as in particular an electromechanical brake booster (iBooster), at least one electric motor operable as a generator, especially an electric motor also able to be used as a drive motor of the vehicle/motor vehicle, at least one piston-cylinder device (an integrated power brake), and/or a pump system having at least one hydraulic pump, the actuation using at least one control signal 16. However, the examples of the at least one vehicle deceleration device enumerated here is not all-inclusive.

In the example of FIG. 1, control unit 10 (as "an autonomous component") is developed separately from the at least one vehicle deceleration device 12 interacting with it. As an alternative, control unit 10 is able to be installed in/integrated into the single vehicle deceleration device 12 interacting with it or in one of vehicle deceleration devices 12 interacting therewith. Vehicle deceleration device 12 having integrated control unit 10 may be a brake booster connected or able to be connected upstream from a master brake cylinder such as especially an electromechanical brake booster (iBooster), an electric motor operable as a generator, in particular an electric motor also usable as a drive motor of the vehicle/motor vehicle, a piston-cylinder device, preferably an integrated power brake, or a pump system having at least one hydraulic pump. Additional exemplary embodiments for vehicle deceleration device 12 having integrated control unit 10 are also possible.

Electronics device 14 of control unit 10 has a memory unit 18 in which a characteristic curve is stored, which specifies a relation between a first input variable $x_{input}$ specified by a driver by an operation of a brake actuation element 20 of the vehicle, and a setpoint variable $a_{vehicle}$ with regard to a setpoint vehicle deceleration $a_{vehicle}$ to be exerted on the vehicle with the aid of the at least one vehicle deceleration device 12. Setpoint variable $a_{vehicle}$ for example, may be setpoint vehicle deceleration $a_{vehicle}$ to be exerted on the vehicle or at least one actuating variable of the at least one vehicle deceleration device 12 that triggers corresponding setpoint vehicle deceleration $a_{vehicle}$ by the at least one actuated vehicle deceleration device 12. For example, (at least) one characteristic curve is able to be stored in memory unit 18, which specifies a relation between first input variable $x_{input}$ and a setpoint current magnitude to be output to a motor of an electromechanical brake booster, a motor of a piston-cylinder device, and/or a motor of a pump system; a relation between first input variable $x_{input}$ and a setpoint rotational frequency of the motor of the electromechanical brake booster, of the motor of the piston-cylinder device and/or of the motor of the pump system; a relation between first input variable $x_{input}$ and a setpoint booster force of a brake booster, in particular the electromechanical brake booster; a relation between first input variable $x_{input}$ and a setpoint generator brake torque of an electric motor operable as a generator; a relation between first input variable $x_{input}$ and a setpoint brake pressure in at least one wheel brake cylinder; and/or a relation between first input variable $x_{input}$ and a setpoint friction-brake torque of the at least one wheel brake cylinder. However, the examples of characteristic curves enumerated here are not to be considered all-inclusive.

Electronics device 14 is developed to actuate the at least one vehicle deceleration device 12 under consideration of the characteristic curve and (current) first input variable $x_{input}$ (using the at least one control signal 16) in such a way that the vehicle is able to be decelerated or is decelerated with the aid of the at least one actuated vehicle deceleration device 12. The vehicle is preferably decelerated by the at least one actuated vehicle deceleration device 12 using an instantaneous vehicle deceleration that corresponds to setpoint vehicle deceleration $a_{vehicle}$. In particular, the vehicle is able to be decelerated or is decelerated using an instantaneous vehicle deceleration that is a function of the characteristic curve and the (current) first input variable $x_{input}$. A respective deceleration of the vehicle may be understood both as a slowing of the vehicle and bringing the vehicle to a standstill (or keeping it at a standstill).

Control unit 10 is preferably linkable or linked to vehicle brake actuation element 20, e.g., a brake pedal of the vehicle, and/or to at least one brake actuation element sensor 22 of the vehicle, in such a way that the first input variable $x_{input}$ specified by the driver of the vehicle by his actuation of brake actuation element 20 is able to be evaluated with the aid of electronics unit 14. The at least one brake actuation element sensor 22, for example, may be a pedal travel sensor or a pedal angle sensor, a rod travel sensor, a differential travel sensor, a driver brake force sensor, and/or a master brake cylinder pressure sensor/admission pressure sensor, for example. In particular, electronics unit 14 may be developed to evaluate as first input variable $x_{input}$ a pedal travel, an input rod travel, a differential travel, a driver brake force exerted on brake actuation element 20, and/or a master brake cylinder pressure/admission pressure in a master brake cylinder connected downstream from brake actuation element 20. However, the examples mentioned here for brake actuation element 20, the at least one brake actuation element sensor 22 and first input variable $x_{input}$ should be considered merely examples. In particular, first input variable $x_{input}$ may be understood as any variable representing a driver brake input. Electronics unit 14 is then configured to actuate the at least one vehicle deceleration device 12 using the at least one control signal 16 under consideration of the characteristic curve and the (current) first input variable $x_{input}$.

In addition, electronics unit 14 is developed to newly specify at least one characteristic curve value of the characteristic curve and to store the correspondingly modified characteristic curve in memory unit 18. The new specification of the characteristic curve is implemented under consideration of a second input variable $y_{input}$ specified by the driver with the aid of an operation of an accelerator 24 of the vehicle/motor vehicle, a current traffic and/or environment situation ascertained by at least one vehicle-installed and/or external traffic and/or environment detection device 26 and 28, and/or an ascertained position of the vehicle and an item of position-specific traffic and/or environment information $I_{traffic}$ read out or queried using the ascertained position. Electronics device 14 thus offers a self-learning adaptation of the characteristic curve to preferences of the driver based on his actuation of accelerator 24 and/or based on a deviation or an agreement of his driving behavior with regard to the current traffic and/or environment situation, and/or with regard to the position-specific item of traffic and/or environment information $I_{traffic}$. This makes it possible to adapt the characteristic curve to personal preferences of the individual driver. The self-learning adaptation of the characteristic curve during the actuation of the at least one vehicle deceleration device 12 gives the driver a better feeling of safety, reliability and trust in his vehicle.

For instance, after a braking operation induced by the at least one actuated vehicle deceleration device 12, electronics unit 14 may be developed to reduce at least one characteristic curve value of the characteristic curve if at least the second input variable $y_{input}$ specified by the driver during a first time interval after the induced braking operation exceeds a predefined maximum value. A strong acceleration of the vehicle using a second input variable $y_{input}$ above the predefined maximum value by the driver in this case is taken as an indication by electronics device 14 that the vehicle was decelerated too strongly for its driver. Accordingly, after a braking operation induced with the aid of the at least one actuated vehicle deceleration device 12, electronics device 14 may also be configured to increase at least one characteristic curve value of the characteristic curve if at least second input variable $y_{input}$ specified by the driver during the first time interval after the induced braking operation remains below a predefined minimum value. The fact that the driver accelerates using only a second input variable $y_{input}$ below the predefined minimum value after the induced braking operation often indicates that the driver considers the induced braking as barely sufficient and therefore hesitates with a renewed acceleration of his vehicle.

It is also advantageous if electronics device 14 is developed to specify a setpoint velocity of the vehicle based on the ascertained current traffic and/or environment situation. As an alternative or in addition to the ascertained current traffic and/or environment situation, the ascertained position of the vehicle and the position-specific item of traffic and/or environment information $I_{traffic}$ are also able to be evaluated or are evaluated by electronics device 14 in order to specify the setpoint velocity of the vehicle.

If at least one (estimated or measured) instantaneous velocity of the vehicle deviates from the specified setpoint velocity of the vehicle by more than a predefined (positive) limit velocity difference $\Delta_0$ during braking induced by the at least one actuated vehicle deceleration device 12 and/or during a second time interval after the induced braking, electronics device 14 is developed to newly specify at least one characteristic curve value of the characteristic curve. A difference between the specified setpoint velocity of the vehicle and the instantaneous velocity of the vehicle is able to be determined using the following equation (eq. 1), for instance:

$$\Delta = v_{determined} - v_{vehicle}, \quad (eq.\ 1)$$

with $v_{determined}$ denoting the specified setpoint velocity of the vehicle, and $v_{vehicle}$ denoting the (estimated or measured) instantaneous velocity of the vehicle.

A positive difference $\Delta$ above the predefined limit velocity difference that occurs during braking is frequently an indication that the vehicle is not "adequately" braked despite the driver's actuation of brake actuation element 20, and that an increase in at least one characteristic curve value of the characteristic curve would therefore be desirable. Accordingly, a negative difference $\Delta$ below $-\Delta_0$ that occurs during the braking operation often indicates that the vehicle is braked "too strongly" in response to the actuation of brake actuation element 20 by the driver and a reduction of at least one characteristic curve value of the characteristic curve would be better in this case.

A positive difference $\Delta$ above the predefined limit velocity difference $\Delta_0$ that occurs during the second time interval after the induced braking often indicates that the vehicle was not braked "strongly enough" for its driver and that an increase in at least one characteristic curve value of the characteristic curve would therefore be more pleasant for the driver who is hesitating with an acceleration of the vehicle during the second time interval. It may therefore be reliably inferred from a negative difference $\Delta$ below $-\Delta_0$ that occurs during the second time interval after the induced braking operation that the vehicle was braked "too strongly" for its driver and a reduction of at least one characteristic curve value of the characteristic curve would thus be more desirable for the driver requesting a greater acceleration of the vehicle during the second time interval.

All afore-described measures for newly specifying at least one characteristic curve value of the characteristic curve allow for a self-learning adaptation of the characteristic curve to preferences of the driver such that unnecessary "corrective accelerations" of the vehicle on account of previous "excessive" braking of the vehicle are omitted in most instances. The manner in which the vehicle is decelerated thus becomes more driver-friendly. In addition, the self-learning adaptation of the characteristic curve to preferences of the driver contributes to a reduced energy consumption because of the frequent omissions of "corrective accelerations", and possibly also to a reduction of the pollutant emissions of the vehicle. At the same time, when newly specifying at least one characteristic curve value of the characteristic curve, attention can be paid that, given a rapid brake request of the driver in an emergency situation, the vehicle will still be decelerated in a relatively short braking time and within a relatively short braking distance.

The ascertained current traffic and/or environment situation is able to be output or transmitted to electronics device 14 with the aid of at least one output signal $S_{traffic}$ of the at least one vehicle-installed and/or external traffic and/or environment detection device 26 and 28, respectively. For instance, a camera and image evaluation system of the vehicle, a radar system of the vehicle, and/or an ultrasonic sensor system of the vehicle as the at least one vehicle-installed traffic and/or environment detection device 26 is/are able to be mounted on the vehicle separately from control unit 10 and/or integrated into control unit 10. Control unit 10 is able to receive the at least one output signal $S_{traffic}$ also via radio from at least one vehicle-external traffic and/or environment detection device 28 such as a stationary traffic monitoring device, a "communicating traffic light", and/or a "communicating traffic sign", for instance.

With the aid of a position signal $S_{position}$ from a vehicle-installed or external position determination system 30 such as in particular a GPS system (global positioning system), the ascertained position of the vehicle is able to be output to electronics device 14, for instance. Using the ascertained position of the vehicle, electronics device 14 is then able to read out the position-specific item of traffic and/or environment information $I_{traffic}$ from a vehicle-installed information memory unit 32, in particular from an information memory unit 32 integrated into control unit 10, or may query this information via radio from a vehicle-external/central information memory system 34.

Electronics device 14 is preferably developed to specify as the setpoint velocity a setpoint velocity characteristic of the vehicle featuring a minimal energy consumption of the vehicle and/or a minimum pollutant emission of the vehicle, on the basis of the ascertained current traffic and/or environment situation and/or based on the ascertained position of the vehicle and the position-specific item of traffic and/or environment information $I_{traffic}$. In this case, in addition to the self-learning adaptation of the characteristic curve, electronics device 14 also induces the driver to adapt his or her driving behavior to an environmentally friendly driving behavior.

The new specification of at least one characteristic curve value of the characteristic curve performed with the aid of electronics device 14 may also be a new specification of the entire characteristic curve. For instance, this may be done by selecting a selection characteristic curve stored in memory unit 18, a new specification of the selected selection characteristic curve as the characteristic curve, and storing of the newly specified characteristic curve in memory unit 18. In the same way, however, it is also possible to vary at least one parameter of the characteristic curve for the new specification of at least one characteristic curve value of the characteristic curve, e.g., as a "zero section" of the characteristic curve, a "step height" of the characteristic curve, at least one slope of the characteristic curve, at least one minimum value of the characteristic curve, at least one maximum value of the characteristic curve, and/or at least one hysteresis width of the characteristic curve. With the aid of the new specification of at least one characteristic curve value of the characteristic curve, in particular a "jump-in" behavior and/or a "booster behavior" of the at least one vehicle deceleration device 12 is/are able to be developed to be more driver-friendly. Both a stepwise adaptation and a smooth adaptation of the "jump-in" behavior and/or the "booster behavior" of the at least one vehicle deceleration device 12 to the preferences of the driver are possible.

For the new specification of at least one characteristic curve value of the characteristic curve, an algorithm is able to be stored in electronics device 14 (by a manufacturer of control unit 10), which specifies a fixed/predefined sequence in the driver-specific adaptation of the characteristic curve. In particular, a number of characteristic curves and/or characteristic curve parameters is able to be tested one after the other according to the fixed/predefined sequence, until the preferences of the driver have been identified. As an alternative to the previously described process, electronics device 14 may also include an algorithm, which "decides" on its own in which direction a new specification of at least one characteristic curve value of the characteristic curve will be tested in response to a reaction of the driver.

As an optional further development of the present invention, electronics device 14 may additionally be configured to detect modulations and/or fluctuations of the first input variable $x_{input}$ triggered by the driver, and to newly specify and store at least one characteristic curve value of the characteristic curve under consideration of the modulations and/or fluctuations of first input variable $x_{input}$. The modulations and/or fluctuations (identifiable with the aid of electronics device 14) describe a sudden change in first input variable $x_{input}$, which is attributable to a driver-desired correction of his actuation of brake actuation element 20. The modulations and/or fluctuations of first input variable $x_{input}$ triggered by the driver manifest themselves as, for example, "spikes", local minima, local maxima, abrupt movements and/or jittery movements of first input variable $x_{input}$.

All afore-described measures for the new specification of at least one characteristic curve value of the characteristic curve are able to be utilized for a "driver-specific improvement" of the characteristic curve. The brake characteristic of the at least one vehicle deceleration device 12 thus corresponds more and more to a personal preference of the driver.

Figure 2:
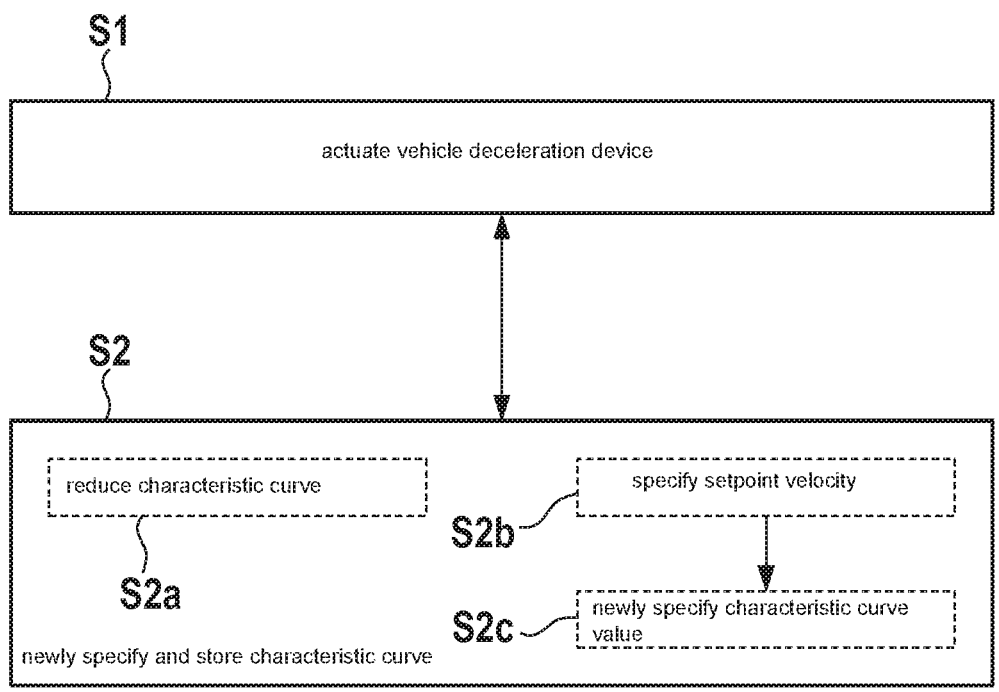
FIG. 2 shows a flow diagram for describing a specific embodiment of the method for operating at least one deceleration device of a vehicle.

FIG. 2 shows a flow diagram to describe a specific embodiment of the method for operating at least one vehicle deceleration device of a vehicle in accordance with the present invention.

It is expressly pointed out that an executability of the method described herein is neither restricted to a certain type of the at least one vehicle deceleration device nor to a specific vehicle type/motor vehicle type of the vehicle/motor vehicle equipped with the respective vehicle deceleration device. Examples of the at least one operated vehicle deceleration device have already been mentioned in previous the text.

The present example method includes a repeatedly executed method step S1 in which the at least one vehicle deceleration device is actuated under consideration of a first input variable specified by a driver by an actuation of a brake actuation element of the vehicle, and a characteristic curve, which is stored in a memory unit and predefines a relation between the first input variable specified by the driver and a setpoint variable with regard to a setpoint vehicle deceleration to be exerted on the vehicle with the aid of the at least one vehicle deceleration device, the actuation being implemented in such a way that the vehicle is decelerated with the aid of the at least one actuated vehicle deceleration device. The actuation of the at least one vehicle deceleration device takes place in method step S1, preferably in such a way that a current instantaneous vehicle deceleration according to a setpoint vehicle deceleration specified as a function of the first input variable and the characteristic curve is exerted on the vehicle with the aid of the at least one vehicle deceleration device. Examples of the first input variable and the brake actuation element of the vehicle have already been enumerated in the earlier text. Specific embodiments for the characteristic curve were also already mentioned earlier.

Before, simultaneously with or after method step S1, a method step S2 is carried out as well, in which at least one characteristic curve value of the characteristic curve is newly specified and stored in the memory unit. The new specification of at least one characteristic curve value of the characteristic curve is carried out under consideration of a second input variable specified by the driver by an actuation of an accelerator of the vehicle; a current traffic and/or environment situation ascertained with the aid of at least one vehicle-installed and/or external traffic and/or environment detection device, and/or an ascertained position of the vehicle and an item of position-specific traffic and/or environment information read out or queried using the ascertained position.

For example, method step S2 includes a sub-step S2a, which is carried out after a braking operation induced with the aid of the at least one actuated vehicle deceleration device. If at least the second input variable specified by the driver during a first time interval after the induced braking operation exceeds a predefined maximum value, then at least one characteristic curve value of the characteristic curve is able to be reduced as sub-step S2a. In the same way, if at least the second input variable specified by the driver during the first time interval after the induced braking operation remains below a predefined minimum value, at least one characteristic curve value of the characteristic curve is able to be increased as sub-step S2a.

Alternatively or additionally, method step S2 may also include two sub-steps S2b and S2c. In sub-step S2b, a setpoint velocity of the vehicle is first specified based on the ascertained current traffic and/or environment situation and/or based on the ascertained position of the vehicle and the position-specific item of traffic and/or environment information. Possibilities for specifying the setpoint velocity of the vehicle based on the data mentioned here or for determining the data mentioned here have already been described earlier in the text. In sub-step S2c, if at least one instantaneous velocity of the vehicle deviates by more than a predefined limit velocity difference from the setpoint velocity of the vehicle during a braking operation induced with the aid of the at least one actuated vehicle deceleration device and/or during a second time interval after the induced braking operation, at least one characteristic curve value of the characteristic curve will be newly specified.

Since the advantages of the method steps described here correspond to the advantages of a correspondingly developed electronics device, a further enumeration of the advantages has been omitted.

What is claimed is:

1. A control unit for at least one vehicle deceleration device of a vehicle, comprising:
   an electronics device having a memory unit in which a characteristic curve is stored which specifies a relation between a first input variable specified by a driver by an actuation of a brake actuation element of the vehicle, and a setpoint variable regarding a setpoint vehicle deceleration to be exerted on the vehicle using the at least one vehicle deceleration device, the electronics device is configured to actuate the at least one vehicle deceleration device under consideration of the characteristic curve and the first input variable in such a way that the vehicle is decelerated using the at least one actuated vehicle deceleration device;
   wherein the electronics device is further configured to newly specify at least one characteristic curve value of the characteristic curve and to store a correspondingly modified characteristic curve in the memory unit under consideration of:
      a second input variable specified by the driver by an actuation of an accelerator of the vehicle; and/or
      a current traffic and/or environment situation ascertained using at least one vehicle-installed and/or external: traffic and/or environment detection device; and/or
      an ascertained position of the vehicle and a position-specific item of traffic and/or environment information read out or queried using the ascertained position, wherein the electronics device is configured to reduce at least one characteristic curve value of the characteristic curve after a braking operation induced using the at least one actuated vehicle deceleration device, when at least the second input variable specified by the driver during a first time interval after the induced braking operation exceeds a predefined maximum value.

2. The control unit as recited in claim 1, wherein the electronics device is configured to actuate, under consideration of the characteristic curve and the first input variable: (i) a brake booster connected upstream from a master brake cylinder, and/or (ii) at least one electric motor operable as a generator, and/or (iii) at least one piston-cylinder device, and/or (iv) a pump system having at least one hydraulic pump, as the at least one vehicle deceleration device.

3. A control unit for at least one vehicle deceleration device of a vehicle, comprising:
   an electronics device having a memory unit in which a characteristic curve is stored which specifies a relation between a first input variable specified by a driver by an actuation of a brake actuation element of the vehicle, and a setpoint variable regarding a setpoint vehicle deceleration to be exerted on the vehicle using the at least one vehicle deceleration device, the electronics device is configured to actuate the at least one vehicle deceleration device under consideration of the characteristic curve and the first input variable in such a way that the vehicle is decelerated using the at least one actuated vehicle deceleration device;
   wherein the electronics device is further configured to newly specify at least one characteristic curve value of the characteristic curve and to store a correspondingly modified characteristic curve in the memory unit under consideration of:
      a second input variable specified by the driver by an actuation of an accelerator of the vehicle; and/or
      a current traffic and/or environment situation ascertained using at least one vehicle-installed and/or external: traffic and/or environment detection device; and/or an ascertained position of the vehicle and a position-specific item of traffic and/or environment information read out or queried using the ascertained position, wherein the electronics device is configured to increase at least one characteristic curve value of the characteristic curve if at least the second input variable specified by the driver during the first time interval after the induced braking operation remains below a predefined minimum value.

4. A control unit for at least one vehicle deceleration device of a vehicle, comprising:
   an electronics device having a memory unit in which a characteristic curve is stored which specifies a relation between a first input variable specified by a driver by an actuation of a brake actuation element of the vehicle, and a setpoint variable regarding a setpoint vehicle deceleration to be exerted on the vehicle using the at least one vehicle deceleration device, the electronics device is configured to actuate the at least one vehicle deceleration device under consideration of the characteristic curve and the first input variable in such a way that the vehicle is decelerated using the at least one actuated vehicle deceleration device;
   wherein the electronics device is further configured to newly specify at least one characteristic curve value of the characteristic curve and to store a correspondingly modified characteristic curve in the memory unit under considertion of:
      a second input variable specified by the driver by an actuation of an acceleator of the vehicle; and/or
      a current traffic and/or environment situation ascertained using at least one vehicle-installed and/or external: traffic and/or environment detection device; and/or ascertained position of the vehicle and a position-specific item of traffic and/or environment information read out or queried using the ascertained position, wherein the electronics device is configured to specify a setpoint velocity of the vehicle based on: (i) the ascertained current traffic and/or environment situation, and/or (ii) the ascertained position of the vehicle and the position-specific item of traffic and/or environment information, and wherein if at least one instantaneous velocity of the vehicle deviates during (i) a braking operation induced using the at least one actuated vehicle deceleration device and/or (ii) a second time interval after the induced braking operation, by more than a predefined limit velocity difference from the specified setpoint velocity of the vehicle, the electronics device is configured to newly specify at least one characteristic curve value of the characteristic curve.

5. The control unit as recited in claim 4, wherein the electronics device is configured to specify, based on: (i) the ascertained current traffic and/or environment situation, and/or (ii) the ascertained position of the vehicle and the position-specific item of traffic, and/or (iii) environment information, as the setpoint velocity, a setpoint velocity characteristic of the vehicle including a minimal energy consumption of the vehicle and/or a minimal pollutant emission of the vehicle.

6. A vehicle deceleration device for a vehicle, comprising:
a control unit, including:
an electronics device having a memory unit in which a characteristic curve is stored which specifies a relation between a first input variable specified by a driver by an actuation of a brake actuation element of the vehicle, and a setpoint variable regarding a setpoint vehicle deceleration to be exerted on the vehicle using the at least one vehicle deceleration device, the electronics device is configured to actuate the at least one vehicle deceleration device under consideration of the characteristic curve and the first input variable in such a way that the vehicle is decelerated using the at least one actuated vehicle deceleration device;
wherein the electronics device is further configured to newly specify at least one characteristic curve value of the characteristic curve and to store the correspondingly modified characteristic curve in the memory unit under consideration of:
a second input variable specified by the driver by an actuation of an accelerator of the vehicle; and/or
a current traffic and/or environment situation ascertained using at least one vehicle-installed and/or external: traffic and/or environment detection device; and/or
an ascertained position of the vehicle and a position-specific item of traffic and/or environment information read out or queried using the ascertained position, wherein the electronics device is configured to reduce at least one characteristic curve value of the characteristic curve after a braking operation induced using the at least one actuated vehicle deceleration device, when at least the second input variable specified by the driver during a first time interval after the induced braking operation exceeds a predefined maximum value.

7. The vehicle deceleration device as recited in claim 6, wherein the vehicle deceleration device includes: (i) a brake booster, and/or (ii) at least one electric motor operable as a generator, and/or (iii) at least one piston-cylinder device, and/or (iv) a pump system having at least one hydraulic pump.

8. A method for operating at least one vehicle deceleration device of a vehicle, the method comprising the following steps:
actuating the at least one vehicle deceleration device under consideration of a first input variable specified by a driver by an actuation of a brake actuation element of the vehicle, and a characteristic curve, which is stored in a memory unit and specifies a relation between the first input variable specified by the driver and a setpoint variable with regard to a setpoint vehicle deceleration to be exerted on the vehicle using the at least one vehicle deceleration device, in such a way that the vehicle is decelerated using the at least one actuated vehicle deceleration device;
newly specifying at least one characteristic curve value of the characteristic curve under consideration of:
a second input variable specified by the driver by an operation of an accelerator of the vehicle; and/or
a current traffic and/or environment situation ascertained using at least one vehicle-internal and/or external: traffic and/or environment detection device; and/or
an ascertained position of the vehicle and a position-specific item of traffic and/or environment information read out or queried using the ascertained position;
storing the newly specified characteristic curve in the memory unit, wherein after a braking operation induced using the at least one actuated vehicle deceleration device, at least one characterisitc curve value of the characteristic curve is reduced when at least the second input variable specified by the driver during a first time interval after the induced braking operation exceeds a predefined maximum value.

9. A method for operating at least one vehicle deceleration device of a vehicle, the method comprising the following steps:
actuating the at least one vehicle deceleration device under consideration of a first input variable specified by a driver by an actuation of a brake actuation element of the vehicle, and a characteristic curve, which is stored in a memory unit and specifies a relation between the first input variable specified by the driver and a setpoint variable with regard to a setpoint vehicle deceleration to be exerted on the vehicle using the at least one vehicle deceleration device, in such a way that the vehicle is decelerated using the at least one actuated vehicle deceleration device;
newly specifying at least one characteristic curve value of the characteristic curve under consideration of:
a second input variable specified by the driver by an operation of an accelerator of the vehicle; and/or
a current traffic and/or environment situation ascertained using at least one vehicle-internal and/or external; traffic and/or environment detection device; and/or
an ascertained position of the vehicle and a position-specific item of traffic and/or environment information read out or queried using the ascertained position;
storing the newly specified characteristic curve in the memory unit, wherein after a braking operation induced using the at least one actuated vehicle deceleration device, at least one characteristic curve value of the characteristic curve is increased when at least the second input variable specified by the driver during a first time interval after the induced braking operation remains below a predefined minimum value.

10. A method for operating at least one vehicle decleration device of a vehicle, the method comprising the following steps:
actuating the at least one vehicle deceleration device under consideration of a first input variable specified by a driver by an actuation of a brake actuation element of the vehicle, and a characteristic curve, which is stored in a memory unit and specifies a relation between the first input variable specified by the driver and a setpoint variable with regard to a setpoint vehicle deceleration to be exerted on the vehicle using the at least one vehicle deceleration device, in such a way that the vehicle is decelerated using the at least on actuated vehicle deceleration device;

newly specifying at least one characteristic curve value of the characteristic curve under consideration of:
- a second input variable specified by the driver by an operation of an accelerator of the vehicle; and/or
- a current traffic and/or environment situation ascertained using at least one vehicle-internal and/or external: traffic and/or environment detection device; and/or
- an ascertained position of the vehicle and a position-specific item or traffic and/or environment information read out or queried using the ascertained position;

storing the newly specified characteristic curve in the memory unit;

specifying a setpoint velocity of the vehicle based on: (i) the ascertained current traffic and/or environment situation, and/or (ii) the ascertained position of the vehicle and the position-specific item of traffic and/or environment information;

wherein at least one characteristic curve value of the characteristic curve is newly specified when at least one instantaneous velocity of the vehicle deviates by more than a predefined limit velocity difference from the setpoint velocity of the vehicle during: (i) a braking operation induced using the at least one actuated vehicle deceleration device, and/or (ii) a second time interval after the induced braking operation.

* * * * *